Patented Nov. 6, 1928.

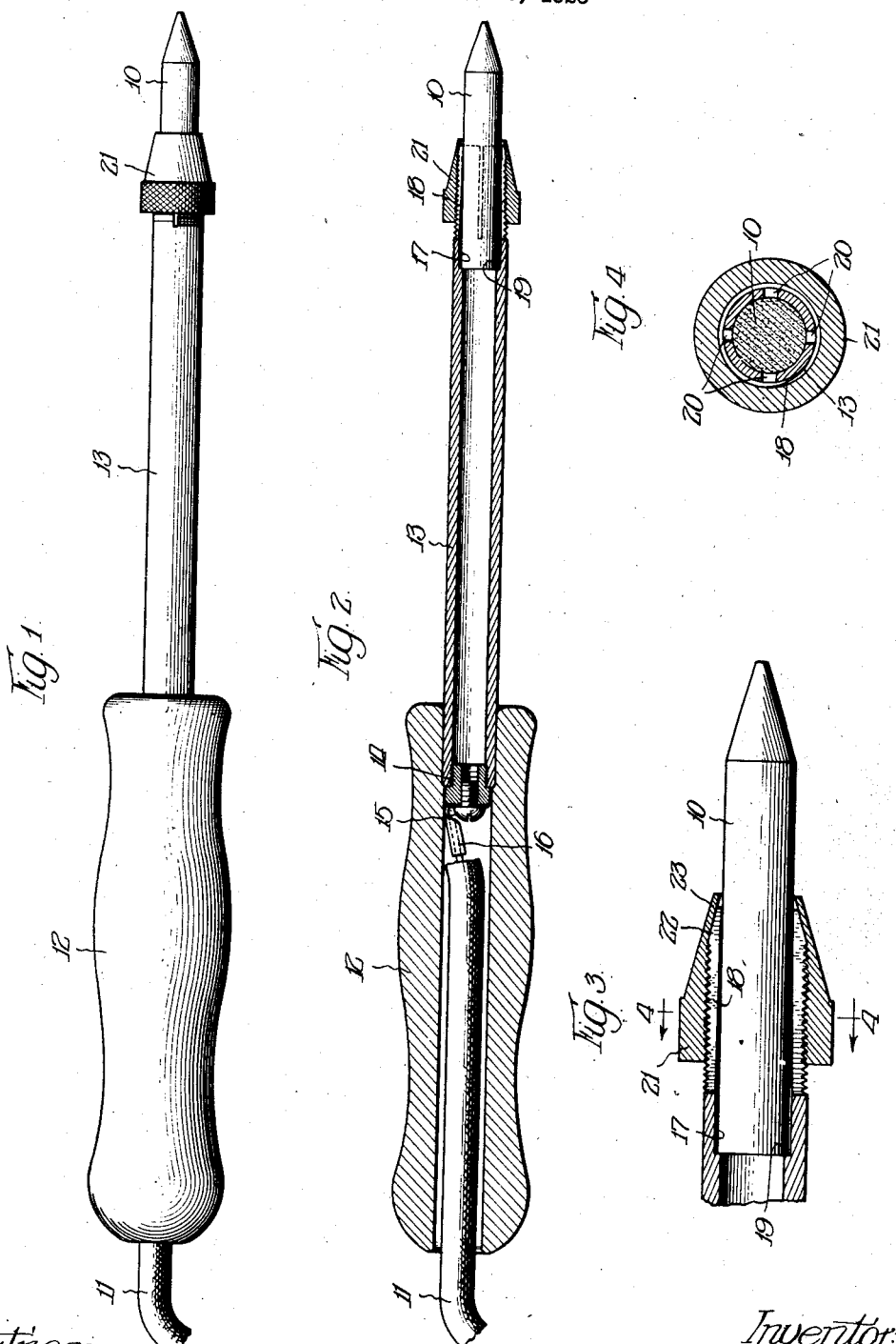

1,690,101

UNITED STATES PATENT OFFICE.

FRANK B. BURNS, OF CHICAGO, ILLINOIS.

SOLDERING TOOL.

Application filed October 28, 1926. Serial No. 144,682.

This invention has to do with electrically heated tools for soldering, cutting, welding and brazing.

The principal object of the invention is to provide an improved tool of the character described which is extremely simple in construction, is inexpensive to produce, will withstand severe usage, and will operate quickly and efficiently.

Other objects and advantages of the invention will be apparent to those skilled in the art upon a full understanding of the construction, arrangement and operation of the improved tool.

One form of the invention is presented herein for the purpose of exemplification, but it will be appreciated that the invention is susceptible of embodiment in other slightly modified structural forms coming equally within the scope of the appended claims.

In the accompanying drawing:

Fig. 1 is a side view of a tool constructed in accordance with the invention;

Fig. 2 is a longitudinal section through the tool;

Fig. 3 is an enlarged longitudinal section through the point of the tool; and

Fig. 4 is an enlarged transverse section through the point, taken on the line 4—4 of Fig. 3.

The tool is adapted to be used with a storage battery, and is provided with a carbon point 10 which is brought to a high temperature by the current of the battery. The current is carried from the battery to the tool through an electric cord 11 which is clamped at one end to the positive or negative terminal of the battery and is secured at the other end to the tool, and the electric circuit is completed through the piece of work to be soldered, cut, welded or brazed by another electric cord which is clamped at one end to the work and at the other end to the other terminal of the battery. If the work is a part of the metal structure of an automobile, and the battery is installed therein and grounded with the frame in the usual manner, the flexible cord between the work and the negative terminal of the battery may be dispensed with and only the cord 11 used.

The tool includes a hollow handle 12 and a long tube 13 which is telescoped for a short distance into the handle. The handle is preferably made of wood and the tube of brass. The end of the tube within the handle is interiorly threaded, and has screwed thereto a centrally apertured bushing 14. The bushing 14 is interiorly threaded, and in turn has screwed thereto a small set screw 15 which serves to clamp a connector 16 on the end of the cord 11 tightly against the end of the bushing 14.

The other end of the tube 13 is counterbored at 17 and receives therein the carbon point 10. The counterboring serves to render the portions 18 of the tube about the point quite thin and flexible, and provides a shoulder 19 against which the inner end of the point will seat. The thin flexible portions 18 of the tube are longitudinally slotted at 20 for a distance inwardly from the end thereof, and are exteriorly screw threaded to receive an exteriorly knurled clamping nut 21. The extreme tips of the separated portions 18 of the tube are beveled at 22, and the nut 21 is provided with a forwardly extending conical sleeve portion 23 which engages with and cams the tips 22 with the portion 18 radially inward into the clamping engagement with the point 10 when the nut is screwed back tight on the tube after the point has been properly positioned.

As will be understood from the foregoing description, the tool is of very simple and inexpensive construction. The principal structural part thereof, namely, the tube 13 which conducts the current from the cord 11 to the point 10, may be readily made up from ordinary tubing of uniform cross section and requires but a few simple threading, counterboring and slotting operations to complete the same. The bushing 14 provides a simple but effective and readily detachable connection between the connector on the cord and the tube; the counterboring in the other end of the tube produces a fixed seat for the point 10; and the nut 21, acting in cooperation with the thin slotted portion of the tube about the point permits a good electrical contact to be established directly between the materials of the tube and point.

I claim:

A tool of the character described, consisting of a long metal tube which is exteriorly threaded and slotted at one end, an electric cord connected with the other end of the tube, a handle of insulating material sleeved over the tube and the cord and covering the connection therebetween, a carbon point seated within and projecting from the threaded and slotted end of the tube, and a nut screwed over the tube about the carbon point and constructed in such a way as to cam the slotted portions of the tube radially inward into clamped engagement with the point, said threaded and slotted end of the tube being counterbored for a short distance to provide an abutting shoulder for the inner end of the point and render the slotted clamping portions of the tube about the point thin and flexible.

In testimony whereof I have hereunto subscribed my name.

FRANK B. BURNS.